United States Patent Office 2,979,833
Patented Apr. 18, 1961

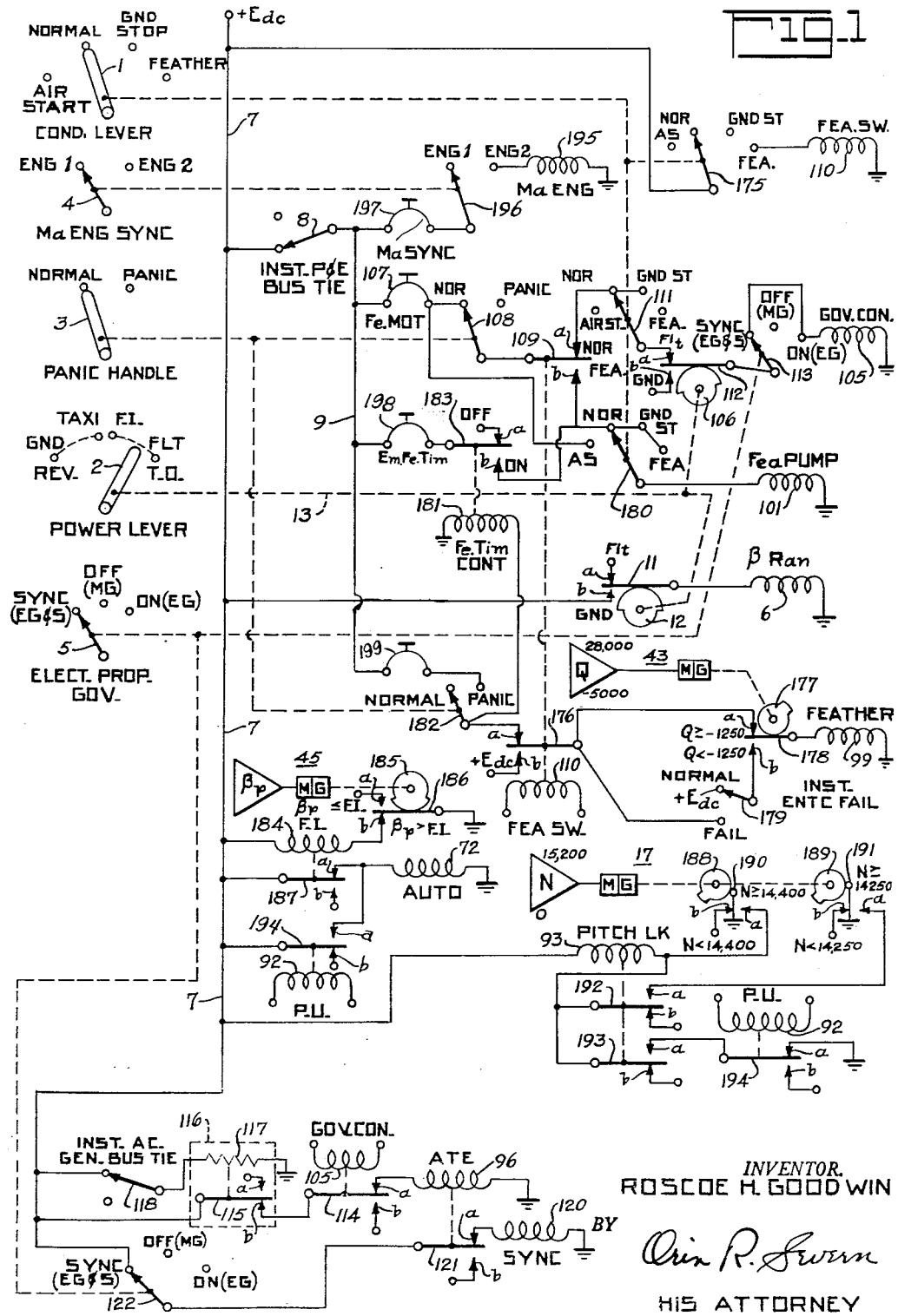

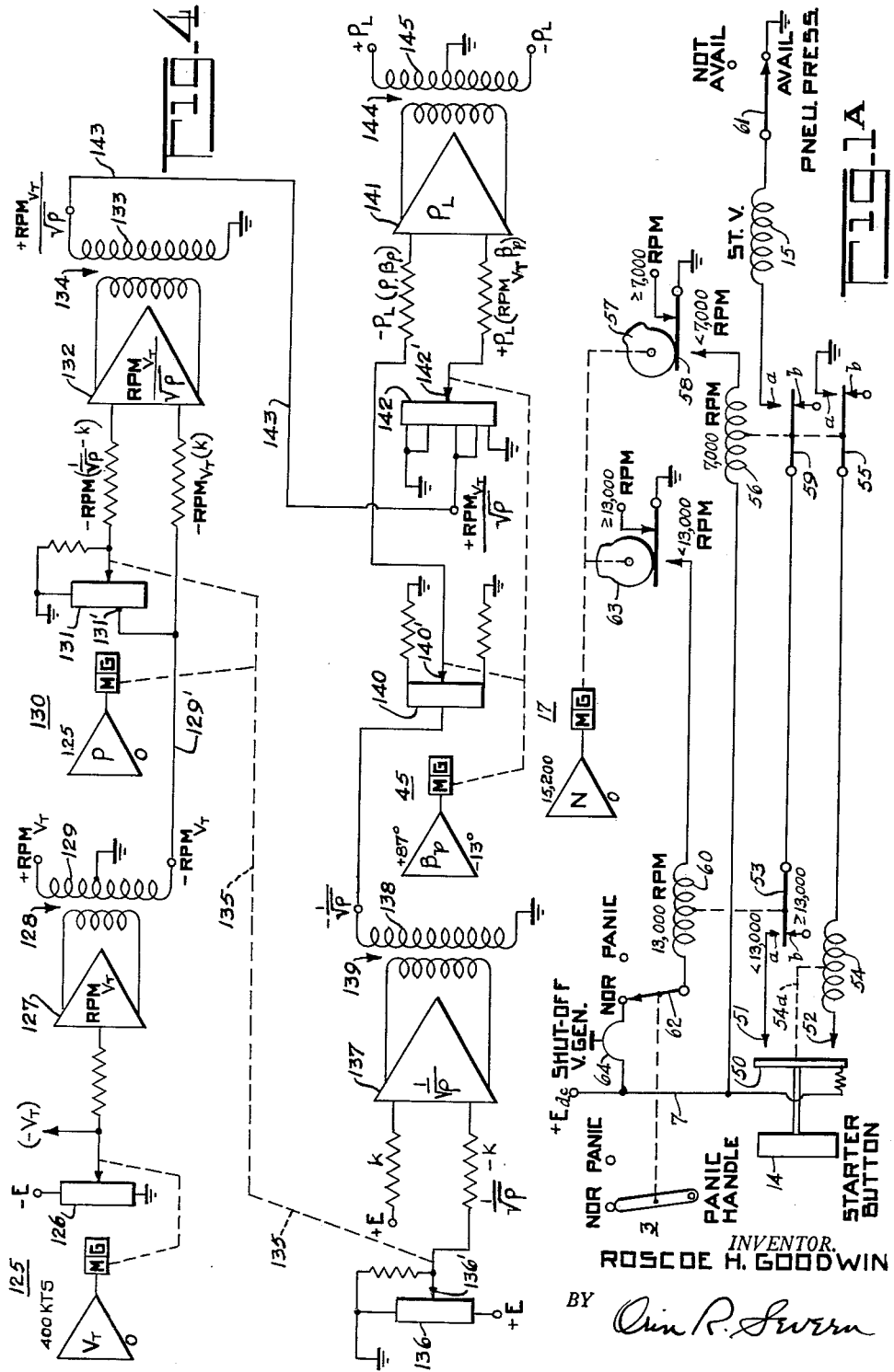

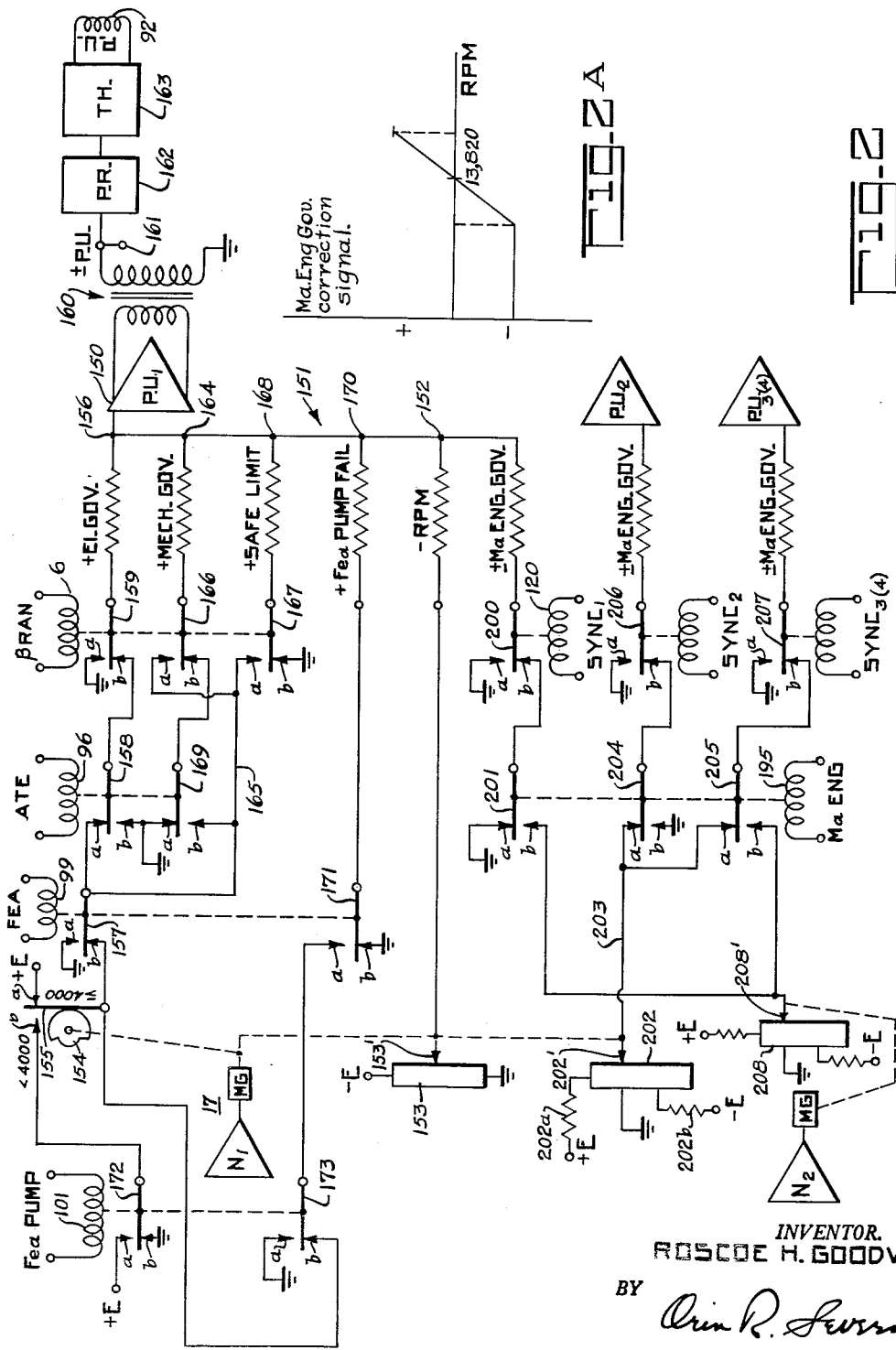

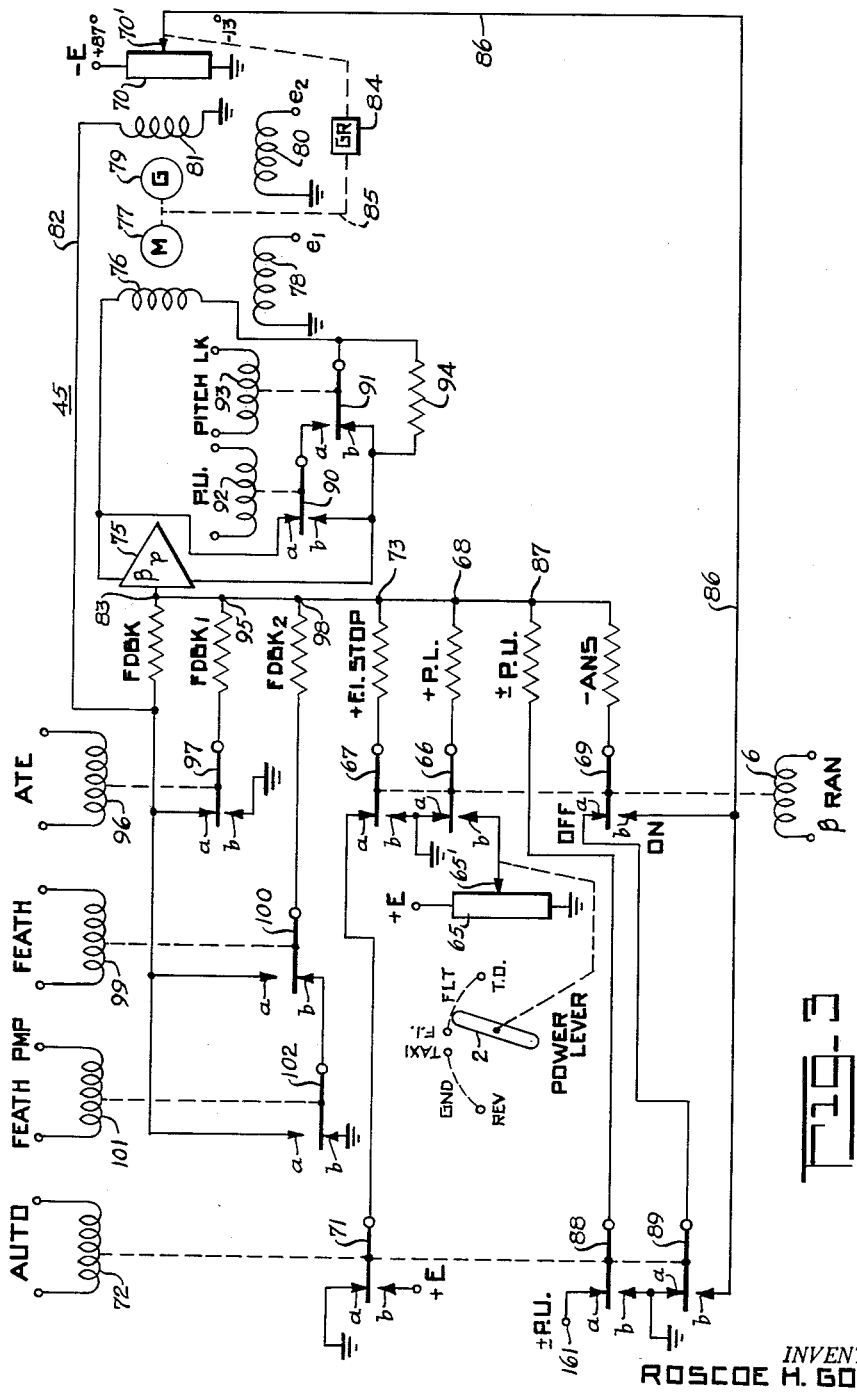

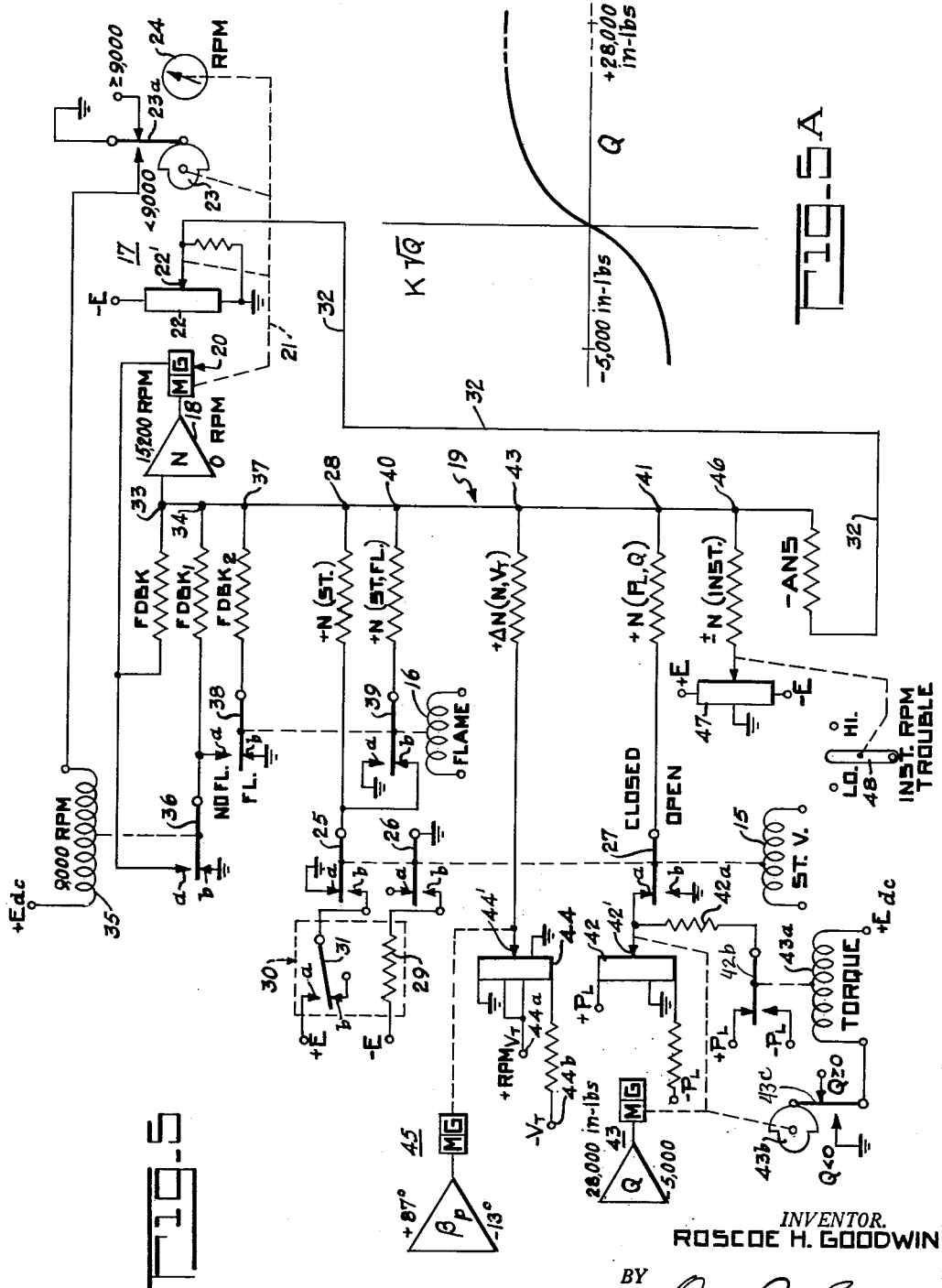

2,979,833

AIRCRAFT TRAINING APPARATUS FOR SIMULATING THE PROPELLER SYSTEM OF TURBO-PROPELLER AIRCRAFT

Roscoe H. Goodwin, Allendale, N.J., assignor to Curtiss-Wright Corporation, a corporation of Delaware Filed Dec. 5, 1957, Ser. No. 700,830

18 Claims. (Cl. 35—12)

This invention relates to ground apparatus for training aircraft personnel, and in particular to apparatus for simulating the operation and control of turbine driven propellers of so-called turbo-prop aircraft.

Simulation of the operation of constant speed, variable pitch aircraft propellers driven by reciprocating piston engines is disclosed by the prior art, an example being U.S. Patent No. 2,788,589 granted April 16, 1957 to Robert G. Stern. The simulation however of turbine-propeller systems has not heretofore to the best of my knowledge been satisfactorily accomplished. This simulation involves unique and quite different problems due to the radical differences between the high speed gas turbine and the reciprocating engine with relation to the drive of a variable pitch propeller. These differences involve the operating characteristics of the gas turbine and practical considerations such as the comparatively high inertia of the turbine assembly rotating at very high speed in its relation to the propeller blade angle control.

A principal object of the invention is new and improved simulating apparatus that is efficient and realistic in representing various phases of operation and control of the propeller system of turbo-propeller aircraft, and that is valuable in the ground training of aircraft personnel.

The invention will be more fully set forth in the following description referring to the accompanying drawings, and the features of novelty will be pointed out with particularity in the claims annexed to and forming a part of this specification.

Referring to the drawings:

Fig. 1 is a diagrammatic illustration of the principal simulated propeller system controls and servo units in their relation to system relays used in the simulating system of the present invention;

Fig. 1A diagrammatically illustrates the control system for the start valve relay used in the simulated turbine starting operation;

Fig. 2 is a similar illustration of the circuitry for producing the automatic governing correction signal, controlling the propeller underspeed relay and synchronizing from a master control engine the remaining engines;

Fig. 2A graphically illustrates the method of applying the synchronizing signal to the simulated slave engines of Fig. 2;

Fig. 3 diagrammatically illustrates the simulated propeller blade angle computing system;

Fig. 4 is a similar illustration of the computing apparatus for producing the simulated propeller load signal $P_L$ for the simulating system;

Fig. 5 diagrammatically illustrates the computing apparatus of the simulated turbine r.p.m. system, and Fig. 5A graphically illustrates the relation between the simulated engine torque and the torque function signal for a given value of propeller load as applied to the r.p.m. servo of Fig. 5.

The present invention although not limited thereto, is shown by way of example as applied to the simulation of a specific turbine driven propeller having in part a hydraulic control system, namely that of the Air Force C–130A aircraft; however it will be understood that the invention is also applicable as well to the simulation of electrical or other control systems for the propeller. In order to avoid duplication of disclosure, simulation of the system of a single propeller unit of the aircraft is described in detail, it being of course understood that this system may be duplicated in obvious manner for a multiple propeller system of this character.

For a better understanding of the invention the aircraft equipment herein simulated in part will first be briefly described. The propulsion and power units of the modern turbo-prop aircraft comprise a variable pitch, constant speed propeller that is driven through reduction gearing by a high speed gas turbine rotating at optimum speed, say about 13,000 r.p.m. As more or less fuel is fed to the turbine to meet power requirements, the speed of the turbine-propeller combination is maintained constant by automatic adjustment of the propeller blade angle so that the power absorbed by the propeller matches the turbine power. In the pilot's compartment or cockpit of the aircraft is a set of primary controls for each engine, each set including a power lever, condition lever and so-called "panic" handle all operable by the pilot. In addition, there is a master engine synchronizing switch and a set of electronic propeller governor switches. During normal flight operation the pilot is concerned only with the power lever which is movable through a continuous angle defining two distinct sectors or ranges of operation, namely, (1) a so-called BETA range (usually used for ground operation) wherein the power lever directly controls the propeller blade angle, starting with advance of the lever from full reverse pitch to about 9° positive pitch, and (2) an AUTOMATIC GOVERNING range wherein the power lever controls the fuel supply to the turbine, and the propeller pitch is automatically adjusted by the regulator and acceleration-sensitive means so as to maintain constant r.p.m. Thus the power lever, starting from the full reverse pitch position, may be advanced through the Beta range and into the automatic governing range up to the full or take-off (TO) power position, and vice versa, as conditions require.

The condition lever has four positions, namely, (1) FEATHER, wherein the propeller can be feathered by main and auxiliary power systems upon failure of the turbine, (2) NORMAL, wherein the usual controls used in flight and for a ground start are available, (3) AIR START, wherein the blade angle is gradually decreased from feather so as to drive the turbine by "windmilling" action preparatory to refiring the turbine, and (4) GROUND STOP, wherein the fuel supply is cut-off. Supplemental to the condition lever in the NORMAL position is a start button that is used primarily for energizing the starter motor.

The "panic" handle is solely for emergy operation and overrides all other controls. It functions to shut off the fuel supply, discharge the $CO_2$ system and feather the propeller, thus shutting down the power system of the corresponding turbo-prop unit.

The instruments in the cockpit that the pilot relies upon with reference to propeller control are the torque meter and the r.p.m. meter. The torque meter indicates the amount of positive or negative torque at the propeller drive shaft, i.e. positive torque as evidenced by turbine drive of the propeller, and negative torque due to "windmilling" effect. The r.p.m. meter simply indicates the speed of the turbine. The turboprop aircraft is provided with a decoupling device between the propeller and turbine so that the drive connection is decoupled when negative torque exceeds a predetermined critical amount; thus, by observing the torque meter, the pilot can during an air start adjust the blade angle gradually for cranking the turbine so as not to exceed the maximum negative torque, namely —4800 in.-lbs. and cause decoupling. Decoupling may take place following engine mal-function and prior to complete feathering of the propeller. Upon feathering, coupling occurs automatically so that the unit is in readiness for an air start, if such is called for.

Synchronization incidental to multi-engine operation is accomplished by selecting one engine as the source of master speed and slaving the other engines to the master engine. The above description covers only basic features of the turbopropeller system. Other features ancillary to operation and control of the propeller under various conditions will be referred to in the following description of the simulating system.

The simulation of the gas turbine system per se which delivers torque to the propeller constitutes a separate invention that is disclosed and claimed in a copending application, S.N. 700,407 filed December 3, 1957 by Robert F. A. Lem, now Patent 2,940,181 and assigned to the same assignee as the present invention.

The simulating system herein described is shown by way of example as of the alternating current (A.C.) type (except where D.C. voltages are expressly indicated) although it will be understood that the system may comprise in whole or in part well known direct current (D.C.) techniques as desired. The system will be described in connection with its functioning under the control of a pilot and/or instructor for a complete simulated flight comprising ground start, take-off, cruising including in-flight conditions such as feathering due to engine malfunction, air-start, etc., landing and engine shut down. For convenience in description, the various relays, etc., of the system are shown in the condition they would assume in normal flight.

Ground start

Referring to the drawings, the conditions requisite for ground start are as follows: the condition lever 1, Fig. 1, is set at NORMAL, the power lever 2, Fig. 1 and 5, is positioned for "ground idle" which is within the indicated ground (GND) or Beta range for setting a flat blade angle of about 0, the panic handle 3 is set at NORMAL, the master engine synchronizing (Ma ENG SYNC) switch 4 is set at the engine No. 1 (ENG 1) position for example, and the electronic propeller governor switch 5 is set at the synchronizing (SYNC) position. A number of system relays are controlled according to the various positions of these levers and switches, and in the present instance the power lever causes energization of the Beta range relay 6 from the main relay source $E_{dc}$ at bus 7 through switch 11 and the relay 6 to ground. The switch 11 is positioned to complete the circuit by the low side of the cam 12 which is in turn connected to the power lever 2 as indicated at 13.

At this stage, simulation of firing and starting of the turbine is in order followed by acceleration up to the "ground idle" speed. This is initiated by operating a start button 14, Fig. 1a, to energize the start valve relay 15, Figs. 1A and 5, for simulating initial cranking of the engine. Subsequently the flame relay 16 is energized for "firing" the turbine. The specific circuitry for controlling the flame relay is not essential for an understanding of the present invention and is disclosed in the aforesaid copending Lem application.

The relays 15 and 16 control in a manner presently described various A.C. input voltages or signals that operate an electrical computing servo system 17, Fig. 5, that represents turbine r.p.m. (N) which will first be described. The system 17 comprises a summing amplifier 18 for algebraically summing in well-known manner the A.C. input signals variable in magnitude and phase relation, which are fed to the amplifier input network generally indicated at 19, and a reversible motor-generator combination (MG) 20 controlled by the output of the amplifier. An MG drive connection indicated at 21 operates a plurality of potentiometers, hereinafter often referred to as "pots," and cam switches, etc., including the answer pot 22, an r.p.m. switch cam 23 and an indicator 24 for representing turbine r.p.m. A specific form of MG control circuitry is later described in connection with Fig. 3, although it will be understood that any suitable servo mechanism or system may be used in practicing the invention. It will be for the present be sufficient to state that the servomotor is operable in speed and direction according to the magnitude and phase relation respectively of the resultant A.C. output signal from the N amplifier 18 so as to position the slider contact 22' on the pot 22, rotate cam 23 according to simulated r.p.m. range and position the r.p.m. indicator 24.

Returning now to the initial starting operation, operation of the start valve relay 15 gang-operates the relay switches 25, 26 and 27, Fig. 5, to the lower positions thereof to engage their respective b contacts. This operation of the switches 25 and 26 introduces a start signal N (ST) to the N input network 19 at terminal 28. In order to simulate the characteristic delay between the operation of the start valve and pick-up in turbine speed, the switch 26 through its b contact closes the circuit of a heater element 29 for a conventional thermal time delay device 30. Heating of the element 29 causes closing of the thermal responsive switch 31 on its a contact so as to complete the start signal circuit that is energized by a constant voltage +E representing starter torque, the switch 25 through its b contact now being connected in series with the thermal switch 31. This starter signal operates the N servo system so as to move the pot slider 22' upward from its zero grounded position and increase the derived voltage from source —E constituting the answer voltage (—ANS) that is applied to the input network by lead 32. When the starter input signal +N (ST) is equalled by the oppositely phased answer signal, the input to the N servo is zero and the servomotor is deenergized to indicate constant r.p.m.

During this initial operation wherein the turbine speed is represented as increasing from zero to about 2,000 r.p.m. under influence of the starter, the dynamic characteristics of the system are simulated by means of a negative feedback signal from the generator of the MG unit to the input network. The resultant feedback signal is varied according to certain operating conditions by connecting one or more circuits including the usual input proportioning resistances in parallel with the permanently connected feedback circuit FDBK at terminal 33. One parallel circuit FDBK₁ connected to the input network at terminal 34 is controlled by the so-called "9,000 r.p.m." relay 35 so as to ground out the shunt circuit by switch 36 at its b contact when the relay is deenergized, i.e. the r.p.m. is equal to or greater than 9,000 r.p.m., and to complete the shunt circuit at the switch a contact when the relay is energized to indicate less than 9,000 r.p.m. Energization of the relay 35 is controlled by the N cam 23 and switch 23a. A second shunt circuit FDBK₂ is connected to the input network at terminal 37 by the flame relay switch 38 through its a contact during the starting operation prior to energization of the flame relay 16. Thus, for the starting condition while the turbine speed is accelerating up to about 2,000 r.p.m., maximum negative feedback is introduced for causing comparatively sluggish response of the servo system in simulation of the engine starting system.

At about 2,000 r.p.m. the flame relay is energized to simulate firing of the turbine. The flame relay switches 38 and 39 are thereby operated to their lower positions to engage their respective b contacts so that switch 38 now grounds out the second feedback shunt circuit FDBK₂ thereby decreasing the amount of feedback. Switch 39, which formerly had grounded out through its a contact the combined start (ST) and flame (FL) signal circuit N (ST, FL) connected to the input network at terminal 40, now connects this circuit in shunt with the N(ST) circuit so as to increase the combined torque signal tending to accelerate the N servo. Acceleration of the servo now under decreased influence of feedback, continues at more rapid rate up to about 7,000 r.p.m., at which point the start valve relay 15 drops out (removing the cranking input signal) and the turbine is represented as being sustained by the flame condition. Specifically, as the start valve relay 15 is deenergized, the switches 25, 26 and 27 move to their upper positions to engage their respective $a$ contacts with the result that switch 25 now grounds out the starter torque N (ST), switch 26 deenergizes the thermal delay device 30 and switch 27 moves from its grounded position to feed to the input network at terminal 41 the main torque input signal $N(P_L,Q)$ that is derived from the potentiometer 42 operated as indicated by the torque (Q) servo 43. The pot 42 is energized at its terminals by oppositely phased voltages representing propeller load ($P_L$) and is designed so that the derived signal voltage at slider 42' represents a function of torque according to the characteristic curve of Fig. 6 this is based on the relationship $$RPM = K\sqrt{Q},$$

for given values of blade angle $B_p$, true airspeed $V_T$, and air density $\rho$.

This torque signal is the primary signal for controlling the N servo during the normal, fired condition of the turbine after the starting period. In order to simulate reversal of this characteristic signal in the negative quadrant according to Fig. 6, two oppositely phased $P_L$ voltages are alternatively applied to the slider 42' through a proportioning resistance 42$a$ and switch 42$b$ when the torque passes through zero as indicated by the grounded position of the pot 42. The switch 42$b$ is operated by the torque relay 43$a$ that is in turn controlled by the torque servo cam 43$b$ and switch 43$c$ as shown. The derivation of the $P_L$ signal will be later described in connection with Fig. 4.

The energizing circuits for the torque servo system 43 are not disclosed herein but are disclosed in the aforesaid copending Lem application directed to the simulated gas turbine system. It is sufficient for present purposes to state that the torque servo operates, according to the computed engine torque, between positive and negative torque limits as indicated.

An additional signal representing the airspeed effect on r.p.m., both for normal and windmilling conditions is applied to the input network circuit $\Delta N(N, V_T)$ at terminal 43. This signal is derived from pot 44 at slider 44' of the blade angle ($B_p$) servo system 45 and is a function of blade angle and true airspeed ($V_T$). The energizing circuits for the $B_p$ servo are described later in connection with Fig. 3. The pot 44 is energized at its terminals 44$a$ and 44$b$ respectively by voltages representing airspeed factors and is designed so as to produce a suitable characteristic signal for modifying the operation of the N servo. The voltages for energizing the pot 44 are in turn derived from other circuitry as later described.

From the aforesaid 7,000 r.p.m. point, the N servo now under the influence of the torque signal at terminal 41 accelerates more rapidly up to its "ground idle" speed of about 13,400 r.p.m. as the relay 35 is deenergized and its switch 36 grounds out the remaining shunt feedback circuit FDBK$_1$.

As desired, a simulated trouble signal of alternate sense may be introduced at any time by the instructor in the input network circuit N(INST) at terminal 46 by means of a pot 47 that is controlled by the instructor's lever 48. The N servo may thus be fed trouble signals either to increase or decrease r.p.m.

As previously indicated the N servo controls according to r.p.m. limits various phases of the ground-start up to "ground idle" r.p.m. This control is interrelated with the condition of the start valve relay and is shown by Fig. 1A. When the starter button 14 is pushed so as to initiate the ground start operation, its contact 50, which is electrically connected to the voltage source $E_{dc}$ at the bus 7, engages the contacts 51 and 52 which are connected respectively to the $a$ contact of the "13,000 r.p.m." switch 53, and the coil of the latching relay 54. The latching relay is connected at its opposite terminal to a switch 55 of the "7,000 r.p.m." relay 56 that has its ground circuit completed by the N servo cam 57 and switch 58 when r.p.m. is less than 7,000. In this condition which prevails at start, the switch 55 engages its $a$ contact to complete the ground circuit for the latching relay 54 which is now energized from the bus and holds the contact 50 in circuit through suitable means indicated at 54$a$. Accordingly, the starter button is latched-in as long as r.p.m. is less than 7,000.

The 7,000 r.p.m. relay which is energized due to the position of the N cam 57 prior to operation of the starter button, also closes switch 59 on its $a$ contact that is in circuit with the start valve relay 15. As the 13,000 r.p.m. relay 60 is energized when r.p.m. is less than 13,000 so as to close its switch 53 on its $a$ contact, it will be apparent that the start valve relay 15 is now energized from the bus through the starter contact 50 and series-connected switches 53 and 59. The ground circuit of relay 15 may also be controlled as desired by an instructor's switch 61 to represent the availability of pneumatic pressure for operating the starter.

Energization of the start valve relay 15 represents opening of the start valve for cranking the turbine. When the simulated turbine speed attains 7,000 r.p.m, the N cam 57 cuts-out the 7,000 r.p.m. relay and the switches 59 and 55 drop to their lower or $b$ contact positions, thereby deenergizing the start valve relay 15 as well as the latching relay 54 which permits the starter button to return to its original position.

Under certain conditions, the start valve relay may be deenergized when turbine speed is still under 7,000 r.p.m. and the start button is depressed. This is accomplished by the 13,000 r.p.m. relay that is controlled by the panic handle switch 62 and the N cam 63. The cam completes the ground circuit of the relay when r.p.m. is less than 13,000 and the switch 62 connects with the bus 7 through the circuit breaker 64 in the normal position. Thus, the pilot may at any time, either by throwing the panic handle to PANIC position or by pulling the Emergency Shut-off Valve circuit breaker 64, deenergize the relay 60 thus causing the switch 53 to drop out and deenergize the start valve relay. For present purposes, the operating limit assigned to the 13,000 r.p.m. relay is arbitrary as this relay also is used for other purposes in the engine system of the aforesaid copending Lem application.

Immediately upon deenergization of the start valve relay 15, Fig. 5, the relay switch 27 moves to its $a$ contact position and brings in the torque signal from pot 42 which as previously described is a function of propeller load ($P_L$). The $P_L$ signal which energizes the pot 42 is derived according to the following relationship:

$$P_L = f(V_T)f(\rho)f(B_p)$$

where $V_T$ is true airspeed, $\rho$ is air density and $B_p$ is propeller blade angle.

Referring to Fig. 4, servo circuitry for computing this equation according to propeller characteristic data includes a plurality of interconnected electrical systems representing primarily the respective factors $V_T$, $\rho$ and $B_p$. The $V_T$ servo system 125 is operable between arbitrary limits of speed, such as from zero to 400 knots and controls a signal pot 126 for deriving the signal $f(V_T)$. Circuitry for controlling the $V_T$ servo is disclosed for example, in Patent No. 2,731,737 granted January 24, 1956 to R. G. Stern. This $V_T$ signal is fed to the terminal 44$b$ of pot 44, Fig. 5, and also to the input of an amplifier 127 representing the effect of airspeed on propeller RPM ($RPM_{V_T}$). The output of this amplifier is fed to a transformer 128, the secondary winding 129 of which is grounded at its mid-portion for producing $RPM_{V_T}$ signals of opposite sense at its terminals. One of these signals is fed to the terminal 44a of pot 44, Fig. 5 and another is fed by lead 129' to the pot 131 of the servo system 130 for producing a signal representing $RPM_{V_T}(1/\sqrt{\rho}-K)$. Circuitry for controlling the $\rho$ servo is disclosed for example in Patent No. 2,788,589 granted April 16, 1957 to R. G. Stern. The pot 131 is suitably designed as indicated for producing a signal corresponding to the reciprocal of the square root of $\rho$, the constant K being represented by the offset from zero of the energizing tap at 131'. This signal is in turn fed to the input of summing amplifier 132 together with the $RPM_{V_T}$ signal from the servo transformer 128. The resultant of these signals at the output of the amplifier 132 is represented by a signal voltage $RPM_{V_T}/\sqrt{\rho}$ at the terminal of the secondary winding 133 of the output transformer 134. This signal is used in the direct computation of $P_L$ as presently described.

Referring again to the $\rho$ servo 130, this servo controls through a connection 135 a function pot 136 for producing a signal $$\left(\frac{1}{\sqrt{\rho}}-K\right)$$

at the slider 136'. This signal is fed, together with a constant voltage signal $+E$ representing the constant K, to a summing amplifier 137, the output of which appears as a signal $$\frac{1}{\sqrt{\rho}}$$

on the secondary winding 138 of the output transformer 139. This signal energizes the function pot 140 of the $B_p$ servo system 45 and the signal derived at the slider 140' represents the effects of air density and blade angle on propeller load. This signal is in turn fed to the $P_L$ computing amplifier 141. A second function pot 142 of the $B_p$ system is connected as indicated by lead 143 to the secondary winding 133 of transformer 134 so as to be energized by the above described signal $RPM_{V_T}/\sqrt{\rho}$. The derived signal at slider 142' which is fed to the $P_L$ amplifier represents the effects of $RPM_{V_T}$, $\rho$ and $B_p$ on propeller load, $P_L$. The resultant signal appearing at the output of amplifier 141 represents $P_L$ and is fed to the output transformer 144 having a secondary winding 245 that is grounded at its mid-portion so as to produce $P_L$ signals of opposite sense at its terminals. These $P_L$ signals are used for energizing the circuitry of the function potentiometer 42 of Fig. 5 as above described.

*Take-off*

With the turbine now running at ground idle r.p.m. the aircraft is ready for take-off. This operation is initiated by advancing the power lever through the Beta and automatic governing ranges to the maximum or take-off (TO) power position. During this movement the propeller pitch is first increased by the power lever up to about 9° of positive pitch, after which the blade angle control is transferred to the automatic governing system for producing maximum propeller thrust at constant turbine speed. In the simulation of this system, the power lever 2, Fig. 3, is advanced as above indicated to the TO position. During the initial movement of the power lever the blade angle ($B_p$) servo system 45 is directly under the control of the power lever as long as it is in the Beta range. Specifically, the power lever 2 controls as indicated, the slider 65' of a potentiometer 65 that is energized by a constant voltage $+E$ so that the derived voltage at the slider represents the blade angle corresponding to the power lever position. This voltage constitutes the main input signal for the $B_p$ system when operating in the Beta range and is applied through the Beta range relay switch 66 and its $b$ contact to the input network of the $B_p$ system at terminal 68.

The Beta range relay 6 is energized, as previously described in Fig. 1, when the power lever is in the Beta range so that the Beta relay switches 66, 67 and 69 now are at their lower $b$ contact positions. Thus a power lever (PL) signal is applied to the $B_p$ input network by the switch 66, an "FI (flight idle) stop" signal is grounded out by the switch 67 and the answer pot 70 of the $B_p$ servo is connected by the switch 69 to the input network for operating the $B_p$ system as a position servo in well-known manner, according to the PL signal from pot 65.

In the deenergized position of the Beta range relay the switches 66, 67 and 69 are at their upper or $a$ contact positions whereby the PL and answer signals are grounded-out. A constant FI stop signal $+E$ may be fed through switch 67 to the $B_p$ system according to the position of the automatic governing (AUTO) relay switch 71 of the AUTO relay 72 which will be later described. This relay also controls the main input to the $B_p$ system for automatic governing control, i.e. the propeller underspeed (PU) signal.

The $B_p$ servo system which is in general typical of the servo motor systems used throughout the present simulating system and which is conventional alternating current two-phase servomotor system, will be briefly described. The servo system comprises a servo amplifier 75 that is energized at its input side from the aforesaid input network and functions as a summing amplifier of well-known type as described in connection with the N servo amplifier 18, Fig. 5. The amplifier resultant signal, which may vary in magnitude and phase relation with respect to a reference voltage, energizes the control winding 76 of a servomotor 77 of the well-known two-phase type. The second or reference winding 78 of the servomotor is energized by a constant reference voltage $e_1$ that is dephased 90° with respect to the control voltage on winding 76. The operation of this type of motor is well-known, the rotation being in one direction when the control and reference voltages in the respective phase windings have the same instantaneous polarity, and in the opposite direction when the instantaneous polarity of the control voltage is reversed with respect to the reference voltage, the rate of rotation in both cases depending on the magnitude of the control voltage. The motor control circuitry is shown in elementary form in the interest of clearness and it will be understood that other known servo systems may be used according to specific requirements.

The servomotor 77 drives a two-phase feedback generator 79 also having a reference phase winding 80 that is energized by a 90° dephased reference voltage $e_2$, and a second phase winding 81 for generating a velocity feedback voltage FDBK that is fed by lead 82 to the input network at terminal 83 for purposes of speed response control. The negative feedback signal which may vary in magnitude and polarity according to the speed and direction of rotation of the generator, represents rate of change of blade angle and may be modified as hereinafter described to represent different speed response characteristics of the $B_p$ system. The servomotor also serves to gang-operate through the gear reducer 84 and suitable mechanical connections indicated at 85, one or more pots, switching cams, etc. In the present instance the slider 70' of pot 70 is positioned so as to derive an answer voltage from the pot 70 that is fed by line 86 to the $b$ contact of the Beta range switch 69 in the input network. Accordingly when the Beta range relay is energized, the answer pot 70 is connected to the input network for causing the $B_p$ system to function as a position servo; when the Beta range relay is deenergized, the answer signal is cut-out, as is also the $P_L$ signal from pot 65, and the $B_p$ system then functions primarily as an integrating servo in the automatic governing range under influence of the main propeller underspeed (PU) signal at the input terminal 87.

The PU signal is derived by the circuitry later described in Fig. 2 and is cut-in by the AUTO relay switch 88 at its $a$ contact when the AUTO relay 72 is energized, thus indicating that the system is in the automatic governing range. The switch 88 grounds out the PU signal at its $b$ contact when the AUTO relay is deenergized, indicating transfer from the automatic governing range. The AUTO relay 72 also controls a switch 89 that grounds out the answer signal circuit on its $a$ contact when the relay is energized and that completes the answer signal circuit through its $b$ contact when the relay is deenergized, thus ensuring operation of the $B_p$ system as a position servo independently of the Beta range relay when the system is out of the governing range. At this time the $B_p$ inputs are the signal $+E$ at terminal 73 from the $b$ contact of the AUTO switch 71 through switch 67, and the $B_p$ answer signal through the AUTO switch 89, $b$ contact. The signal $+E$ corresponds to the flight idle (FI) blade angle. These signals will cause the $B_p$ servo to position at the flight idle angle when the AUTO relay is deenergized.

Each potentiometer of each servo system is shaped or contoured so that the value of the derived voltage at the slider contact bears a desired relationship to the angular movement of the contact depending on the particular function of the potentiometer, and has a voltage impressed across its terminals depending as to instantaneous polarity and magnitude also on the function of the potentiometer. The resistance element of the potentiometer may be of the well-known wound card type and of circular or band form but is diagrammatically illustrated in a plane development for clearness. A structural form of potentiometer that may be used in practice is shown by Patent No. 2,431,749 issued December 2, 1947 to R. B. Grant.

The contour of all function potentiometers represents the derivative of the function concerned and since this involves mathematical relationships the potentiometer cards are shown uniform for simplifying the disclosure. Specifically, the contour or width variation and therefore the resistance distribution of a potentiometer is proportional to the derivative of the function of the characteristic to be simulated with respect to the variable represented by the setting of the potentiometer. For example, let a linear function be assumed as where a derived voltage is to be directly proportional to the distance that the potentiometer contact is from a zero position. The slope of the function curve then is the constant ratio of derived voltage to the increase in the independent variable represented by the contact travel from the zero position. The derivative of this relationship is the same for all contact settings so that the width of the potentiometer card in this case is uniform, making it rectangular in shape. Thus the width of the card at any given contact position is determined by the linear or non-linear character of the function.

Referring again to Fig. 3, the $B_p$ system output is subject to various controls for simulating conditions incident to operation of the PU and PITCH LOCK relays. The $B_p$ servo motor control winding 76 is normally energized by the output signal from the amplifier 75. However this winding may be short-circuited by a shunt connection including the series-connected switches 90 and 91 when the respective PU and pitch lock relays 92 and 93 are energized. In this condition, a protecting load resistance 94 is connected across the amplifier output and the motor winding 76 is shorted-out to stop the motor for representing a pitch lock condition. This circuitry simulates the ratchet operation incident to PITCH LOCK wherein blade angle can be increased but not decreased under certain conditions as described under "PITCH LOCK." The control of the PU and pitch lock relays 92 and 93 will be later described in connection with Figs. 2 and 1 respectively.

The speed response characteristics of the $B_p$ servo are as previously indicated controlled according to feedback. The primary feedback circuit FDBK is permanently connected in the input network to represent the speed response characteristics when the $B_p$ system is in the Beta range and out-of-feather. When the system is represented as being under acceleration sensitive governing (ATE) control a first shunt circuit $FDBK_1$ is connected at input terminal 95 across the primary feedback circuit by the ATE relay 96 and switch 97 as at its $a$ contact. This increases the amount of negative feedback, resulting in greater damping of servo system. When the system is out of ATE control, the relay 96 is deenergized, Fig. 1, and switch 97 grounds out the first shunt feedback circuit at its $b$ contact. A second shunt feedback circuit $FDBK_2$ is also connected at terminal 98 of the input network across the primary feedback circuit by means of the feather relay 99 and switch 100 at its $a$ contact when the feather relay is energized as later described in connection with Fig. 1. The switch 100 grounds out the second feedback shunt circuit at its $b$ contact when the feather relay 99 and also the feather pump relay 101 are deenergized. The relay 101 controls a switch 102 that grounds out this circuit at its $b$ contact and also ensures connection of the shunt circuit at its $a$ contact when the feather pump relay is energized and the feather relay remains deenergized. The operation of the $B_p$ system under influence of this variable feedback control will be more fully described in connection with the feathering and ATE simulation.

It will now be seen that the $B_p$ servo system is operable with minimum damping when operating as a position servo in the Beta range under direct control of the $P_L$ signal from the power lever, and that when the control is transferred to AUTO, the $B_p$ system, now operating as an integrating servo under control of the PU signal, is damped by the additional feedback introduced by the ATE relay to represent acceleration sensitive governor control of blade angle. It will be apparent that damping also occurs when the feedback is increased incident to shunting in $FDBK_2$ by energization of the feather relay upon call for "feather." The $FDBK_2$ damping shunt is also connected in circuit when the feather pump relay 101 is energized and the feather relay 99 is deenergized incident to "Air Start" subsequently described.

When the power lever is advanced for take-off simulation, various control relays relating to transfer of control to automatic governing are directly affected. Referring again to Fig. 1, when the power lever 2 is at TO position, the governor connect (Gov. Con.) relay 105 is energized and the Beta range relay 6 is deenergized by operation of the cams 106 and 12 respectively which are positioned by the power lever. The circuit of the governor connect relay is energized from the D.C. bus 7 through the normally closed propeller and engine (P and E) bus tie switch 8, lead 9, feather motor (Fe. Mot.) circuit breaker 107, panic switch 108 that is operable by the panic handle 3, feather switch (FEA. SW.) relay switch 109 at its $a$ contact operable by the feather switch relay 110, condition lever switch 111 operable as indicated by the condition lever and positioned at NORMAL, cam switch 112 at its $a$ contact (or flight (FLT) position), synchronizing switch 113 at SYNC position controlled by the main synchronizing switch 5 and the relay winding 105 to ground. As the synchronizing switch is normally at SYNC (EG & S) position representing electronic governing and synchronization, and the switches 108 and 111 at NORMAL positions, operation of the power lever cam 106 between the ground (GND) and flight (FLT) positions controls the governor connect relay under usual conditions. Concurrently, the power lever cam 12 opens the circuit of the Beta range relay 6 by moving the switch 11 from its *b* contact to the isolated *a* contact.

The governor connect relay 105 in turn controls energization of the acceleration sensitive electronic governing (ATE) relay 96, Fig. 1, through the switch 114 at its *a* contact and a series-connected thermal responsive switch 115 of a thermal delay device 116 connected to the bus 7. The thermal delay device 116 comprises a heater element 117 that is normally energized from the bus through the A.C. generator bus tie switch 118 so as to cause the switch 115 to warp towards its *b* contact and close the circuit. The delay at switch 115 following closing of switch 118 simulates the heating time of the electronic equipment represented by the ATE relay. Simulation of failure of the A.C. generator is done by the instructor opening the switch 118, thereby deenergizing the heater 117 which permits the thermal responsive switch 115 to cool and open the circuit at its *b* contact.

The ATE relay 96 in turn controls energization of the synchronizing (SYNC) relay 120 through the switch 121 at its *a* contact and a series-connected switch 122 that is connected to the bus 7 and positioned according to the main synchronizing switch 5. Accordingly, the SYNC relay is deenergized when the ATE relay drops out, representing the non-governing condition, and also when the SYNC switch is in other than the synchronizing position.

Referring briefly to Fig. 3, the propeller underspeed PU signal which is under control of the AUTO relay 72 and switch 88 is as previously stated, the principal input signal for the $B_p$ system when operating in the automatic governing range. The sense of the signal indicates whether increased or decreased $B_p$ is called for, and the magnitude of the signal determines the rate of the $B_p$ change.

Reference is now made to Fig. 2 for description of the computing circuitry for deriving the PU signal and for controlling the PU relay 92. A summing amplifier 150 for computing PU is fed by an input network 151 that may be energized selectively by various signals according to different operating conditions, including Beta and automatic governing operation, feathering, propeller speed and synchronization control. As indicated, the $PU_1$ computer 150 represents control for engine No. 1 of the four-engine aircraft herein simulated, this engine being normally the master speed control for the other engines as hereinafter described under "synchronizing control." The principal input signal to the network 151 is the RPM signal at input terminal 152 that is derived from the $N_1$ servo pot 153. The $N_1$ servo, which represents the turbine speed of engine #1 corresponds to the N servo of Fig. 5. The derived RPM signal at slider 153' represents the instantaneous speed of the propeller that is driven through reduction gearing by the turbine. The $N_1$ servo also controls a cam 154 that operates a switch 155 according to certain limits of turbine RPM. When RPM is equal to or greater than 4,000, switch 155 engages its *a* contact so as to connect in circuit a constant A.C. signal voltage +E, and when RPM is less than 4,000 the switch engages its *b* contact so as either to ground the switch circuit or connect with an alternate constant signal voltage +E, depending on the condition of the "feather pump" relay 101. Normally, the switch 155 is connected at its *a* contact to the aforesaid constant signal source +E. Accordingly assuming now that the control is in the automatic governing range and that the Beta relay 6 is deenergized, the ATE relay (representing acceleration sensitive governing) is energized and the feather relay 99 is deenergized, an automatic governing signal +E representing the reference r.p.m. will be applied to the input network terminal 156 through a circuit comprising the N switch 155, feather relay switch 157 at its *b* contact, ATE relay switch 158 at its *a* contact, Beta relay switch 159 at its *b* contact, and the usual proportioning input resistance at terminal 156. This +E reference signal is opposite in phase sense to the —RPM signal at terminal 152 so that the resultant or difference signal may be either positive or negative in sense depending on the magnitude of the RPM signal. This difference signal energizes the $PU_1$ amplifier 150 which is connected to an output transformer 160 and the amplified $PU_1$ signal appearing at the transformer secondary terminal 161 represents the called-for RPM change. This PU signal is fed to the $B_p$ servo system, Fig. 3, as previously described.

Operation of the PU relay 92 according to the sense of the PU signal is accomplished through a phase sensitive rectifier 162 that is connected to the output of the transformer 160 and to a thyratron 163. The PU signal from the transformer is thereby converted to D.C. depending in polarity on the phase sense of the PU signal. The thyratron is triggered to "fire" and energize the relay 92 when the signal is either zero or positive, and to shut off thus deenergizing the relay, when the signal is negative. Thus, when the summation of the signals at the input network 151 is zero (which is the normal condition) or of positive sense, the PU relay 92 will be energized, and vice versa.

When the system is represented as being under mechanical governor control, as for example in the Beta range operation, the Beta relay 6 is energized, the ATE relay deenergized and the constant signal +E applied to the network terminal 164 through the N switch 155, feather relay switch 157, lead 165 and Beta switch 166 at its *a* contact. In this condition, the automatic governing circuit at terminal 156 is grounded out by Beta switch 159 at its *a* contact. Another Beta switch 167 connects through its *a* contact the lead 165 to the network terminal 168 so as in this instance to connect the proportioning resistance at terminals 164 and 168 in parallel. This combined signal represents "safe limit" operation of engine speed in the Beta range. When control is transferred from the Beta range the aforesaid combined signal is grounded out at terminal 164 by the series-connected Beta switch 166 and ATE switch 169, and at terminal 168 by Beta switch 167, and in place thereof an automatic governing signal is applied at terminal 156; and if ATE control is lost while in the automatic governing range, the ATE and Beta relays are both deenergized and the mechanical governor signal alone is applied through the ATE switch 169 at its *b* contact and the Beta switch 166 at its *b* contact. It will be assumed of course that the feather relay 99 is in its normal deenergized position as shown. When the feather relay is energized to indicate call for feathering of the propeller, the above described circuits at terminals 156, 164 and 168 are grounded out, if not already grounded, by the feather switch 157 at its *a* contact.

An additional signal may be applied to the input network at terminal 170 to represent failure of the electric feather pump, i.e. failure of hydraulic pressure used for feathering. Normally this signal is grounded out by the feather switch 171 at its *b* contact, or, if at feather, by the feather pump switch 173, *a* contact. Assuming now during a call for feather (energization of feather relay 99), failure of the feather pump represented by concurrent energization of the feather relay and deenergization of the feather pump relay 101, the feather switch 171 and feather pump switch 173 now provide from cam switch 155 a signal +E for the PU input network. This +E signal, through the PU and $B_p$ systems, causes the resulting $P_L$ input signal at the N servo, to run this servo to the 4200 RPM position where its remains, thus simulating loss of the pump which is needed for the completion of feathering.

The control circuits for certain of the relays above referred to will now be described with reference to Fig. 1. The feather switch (FEA, SW) relay 110 is energized directly from the D.C. bus 7 through the condition lever switch 175 when it is at FEATHER position. In all other positions of the condition lever the feather switch relay is deenergized. This relay in turn controls through its switch 176 and b contact the energization of the feather relay 99, subject to control of the torque servo (Q) cam 177 and switch 178. This cam is controlled by the torque servo 43 so that the switch is in series through its a contact with the switch 176 when torque equals or exceeds a predetermined value, i.e. −1250 in.-lbs. If torque goes below this critical value, thus calling for automatic feathering, the switch 178 engages its b contact so as directly to energize the feather relay from the source $E_{dc}$ through the instructor's Engine Negative Torque Control (ENTC) fail switch 179.

Normally the cam switch 178 is closed on its a contact indicating normal torque conditions, and the feather switch relay is deenergized so that its switch 176 engages its normally deenergized a contact. Therefore normally the feather relay can be energized only when the relay 110 is energized in response to call for feather, thus closing the switch 176 to engage its energized b contact and complete the circuit for the feather relay 99 through the cam switch 178. In case the simulated torque reaches or drops below the critical negative torque value indicated, the switch 178 transfers the feather relay to an alternate voltage source without reference to the feather switch relay. Thus automatic feathering is simulated whenever the torque drops to a critical negative value. If desired, the instructor may move the switch 179 to the "fail" position thus deenergizing the feather relay, it being assumed that in this case the negative torque is due to malfunctioning of the engine and that the pilot has not yet moved the condition lever to the FEATHER position. In such case the torque will become increasingly negative until a limiting value of −4800 in.-lbs. is reached, at which time propeller and engine will be decoupled and torque will revert to zero as explained in the aforesaid Lem application.

The feather pump relay 101 represents the hydraulic pressure produced by the electric feather pump, which is in addition to a pump driven by the engine. The relay 101 is energized from the bus 7 through the normally closed switch 8, circuit breaker 107, panic switch 108, feather switch relay switch 109 at its b contact (assuming a call for feather and the condition lever switch 180. The switch 180 is in circuit with the b contact of switch 109 except for the air start (AS) position of the condition lever. In the air start position, the feather pump relay is energized directly from the bus through the normally closed circuit breaker 107 and switch 108, regardless of the position of the feather switch relay.

The feather timer control (FE TIM CONT) relay 181 is controlled directly from the bus 7 through the panic handle switch 182 when moved to the "panic" position. This panic switch also supplies voltage to the a contact of switch 176 so that the feather relay also is automatically energized when the panic handle is thrown to panic position, assuming the condition lever to be at NORMAL. The relay 181 in turn operates its switch 183 to engage its b contact, thereby automatically energizing the feather pump relay 101 from the bus when the condition lever is at NORMAL. Thus it will be seen that the feather timer control relay overrides other controls when the panic handle is thrown for ensuring automatic operation of the feather pump and feather relays.

The flight idle (FI) relay 184 is controlled according to the operation of the $B_p$ servo 45. A servo operated cam 185 controls a switch 186 that is normally closed at its b contact to complete the ground circuit of the relay which is directly connected to the bus 7. When the blade angle is represented as less than the flight idle value, the switch 186 is opened and the relay is deenergized.

The flight idle relay in turn normally energizes the automatic governing (AUTO) relay 72 through the switch 187 at its a contact thus completing the bus circuit to the grounded relay 72. The AUTO relay is deenergized when the FI relay drops out in response to $B_p$ control. An alternate circuit including the PU switch 194 also controls the AUTO relay. This circuit is open when the PU relay is energized (for "on-speed" and "underspeed" conditions) and is closed on the a contact to energize the AUTO relay for the "overspeed" condition.

The pitch lock relay 93, referred to in Fig. 3, functions to prevent overspeed and is subject primarily to the control of the N servo 17. This servo operates a pair of cams 188 and 189 for controlling the switches 190 and 191 respectively. The switch 190 is grounded and open when RPM is less than a critical value, i.e., 14,400. The switch 191 is grounded and open when RPM is less than another critical value, i.e., 14,250. The pitch lock relay, which represents locking of the propeller by a ratchet device arranged so that when the ratchet is engaged the blade angle cannot be decreased but however, may be increased, is energized directly from the bus through the grounded switch 190 when RPM is equal to or exceeds 14,400. Further control of the pitch lock relay is provided by the relay switches 192 and 193, the switch 192 engaging its a contact when the relay picks up to complete a holding ground circuit through the cam switch 191 which is now closed at its a contact. Thus the pitch lock relay is provided with a holding circuit for maintaining it energized between the RPM values of 14,400 and 14,250. If however the propeller underspeed PU relay 92 is energized indicating on-speed or a call for increased RPM, i.e. decreased blade angle, the pitch lock relay 93 will remain energized through an alternate holding ground circuit comprising the PU switch 194, pitch lock switch 193, and its a contact, notwithstanding the fact that RPM may have dropped below 14,250. If the PU relay is deenergized calling for decreased RPM, (increased blade angle) the PU switch 94 is open and the pitch lock relay drops out when RPM becomes less than 14,250. This simulates the ratchet operation of pitch lock wherein the pitch lock is initially triggered by the N servo when RPM excedes 14,400 and blade angle is mechanically blocked and freezes at that point, subject however to release of the pitch lock if RPM decreases to less than 14,250 and the governor is calling for increased blade angle. If however the governor is calling for decreased blade angle (increased RPM) the pitch lock will remain in effect thereby tending to prevent an overspeed condition, as described further under "PITCH LOCK," Fig. 3.

The one master engine (MA ENG) relay 195 for the simulated multi-engine system, further described in Fig. 2, is normally deenergized as this relay represents operation of the No. 2 engine as the master speed control. Normally the No. 1 engine is the master control. When however the master control is to be transferred to the No. 2 engine the transfer switch 196 is operated to the ENG 2 position so as to energize the relay 195 directly from the bus as indicated.

Engine Synchronizing control

For a description of the simulated synchronizing control, reference is had to Fig. 2. Normally as previously stated, the No. 1 engine is the master speed control and the other engines are synchronized with and slaved to the No. 1 engine. For this condition, the SYNC. relay 120 is normally energized and the master engine (Ma ENG) relay 195 is deenergized as previously described in Fig. 1. Accordingly the $SYNC_1$ relay switch 200 which is closed at its b contact, and the series-connected master engine relay switch 201 which is closed on its grounded a contact, ground out the master engine governor (Ma ENG GOV) signal at the input network 151. That is, there is no synchronizing governing signal for the No. 1 engine when it functions as the master speed control. The other engines are for brevity diagrammatically illustrated by the propeller underspeed PU systems for the respective engines. The No. 2 engine is represented by the system $PU_2$ and the No. 3 and No. 4 engines which in the present instance are controlled in identical manner are represented by duplicate PU systems designated for convenience as $PU_{3(4)}$.

It will be understood that the $SYNC_{3(4)}$ relay also is indicated as such for brevity and that an identical relay for the No. 4 engine is connected in the same manner to a corresponding PU system also representing the No. 4 engine.

The $N_1$ master r.p.m. signal of engine No. 1 is fed to the other engine systems by means of a potentiometer 202 that is operated by the N servo as indicated. The pot 202 is grounded at a pre-selected mid-portion representing the reference r.p.m. 13,820 corresponding to the setting of the electronic governor. The pot is energized at oppositely positioned terminals by constant voltage signals $+E$ and $-E$ so that the voltage derived at slider 202' represents the master engine governor correction signal. This correction signal is applied by lead 203 through the parallel connected master engine switches 204 and 205 and the respective $a$ contacts thereof, and the corresponding SYNC switches 206 and 207 through the respective $b$ contacts thereof to the PU systems of the Nos. 2, 3 and 4 engines.

Referring to Fig. 2A which indicates a suitable method of correction, it will be noted that a constant negative correction signal is applied to the respective slave engine up to a value approaching the reference r.p.m. value 13,820. The correction signal is gradually reduced as the reference value is approached in either positive or negative direction in order to avoid "overshooting." This application of the correction signal is simulated by the arrangement of the resistances 202a and 202b in the potentiometer terminal circuits. The point of connection of the resistance 202b to an intermediate part of the pot represents the r.p.m. value at which the negative correction signal reaches its maximum value, the signal at lower r.p.m. values leveling off and remaining constant. The maximum positive correction signal is determined by the resistance 202a and the upper limit of the pot as indicated.

The slave engines are controlled by the No. 1 master engine as above indicated in Figs. 2 and 2a. Primarily, the RPM setting of the electronic governor is represented by the governing signal $+E$ which appears at terminal 156 of the $PU_1$ input system and at the corresponding terminals of the other PU engine systems for the basic speed control. If now, $N_1$ should decrease below this setting, a synchronizing signal of negative sense will be derived at slider 202' of pot 202 and this signal fed to the corresponding PU systems of the simulated slave engines, Nos. 2, 3 and 4. The resultant negative signal at the respective PU system input will then in each case produce a correction signal $+PU$ (due to amplifier phase reversed) and cause the corresponding blade angle $B_p$ servo, Fig. 3, to indicate increased blade angle (for decreasing the r.p.m.) and the corresponding thyratron to shut-off thereby deenergizing its respective PU relay indicating an over-speed condition. As the blade angle is increased, the corresponding N system, Fig. 5, receives a signal at its terminal 41 tending to decrease r.p.m. that is, the $P_L$ signal that is derived in part from $B_p$, Fig. 4, is decreased so as to decrease the torque function signal for the N servo, thereby tending to decrease r.p.m. and bring it down to the reference $N_1$ value. The decreased r.p.m. signal is then returned to the input network of the respective PU system, Fig. 2, thus completing that part of the servo loop. Synchronization is attained when each of the slave servo loops is stabilized at the r.p.m. of the master engine.

When the master speed control is to be transferred to the No. 2 engine, the Master Engine Synchronizing switch 196, Fig. 1, is moved to the ENG 2 position to energize the master engine relay 195. In this condition the master engine relay switches 201, 204 and 205, Fig. 2, engage their respective $b$ contacts so that the correction signal for the No. 2 engine is grounded out, and the systems for the No. 1 engine and the No. 3 and No. 4 engines each now receive a correction signal from the pot 208 of the No. 2 engine servo $N_2$, the switches 204 and 205 having cut-out the $N_1$ signal. The $N_2$ pot 208 is similar to pot 202 so that the derived signal at slider 208' represents the master engine governor correction signal for the Nos. 1, 3 and 4 engines now operating as the slave engines. As previously stated the SYNC relays of all engines are normally energized under electronic governing control, i.e. when the ATE relay 96, Fig. 1, is energized, the ATE relay in turn being controlled by the governor connect (GOV CON) relay 105 which is normally energized when the power lever is in the governing or flight range.

*Normal in-flight control*

Following take-off, normal cruise conditions are simulated by the normal automatic governing control above described incident to the pilot's adjustment of the power lever within the flight or automatic governing range according to speed and fuel conservation requirements. The condition lever and the panic handle are both at NORMAL, the Electronic Propeller Governing switch 5 is at SYNC position and the AUTO and ATE relays are energized. Within the automatic governing range, adjustment of the power lever simulates the control of the fuel supply to the turbine for producing torque as more fully described in the aforesaid copending Lem application. As the torque signal from pot 42 of Fig. 5 is increased or decreased, the N servo is directly affected and tends to respond accordingly to any change in this signal. The torque signal as noted is a function of both Q and $P_L$.

As the N servo is thus operated in either positive or negative sense, the resulting RPM signal is balanced against the automatic governing signal $+E$ at the PU system, Fig. 2, so as to produce a resultant PU governing signal depending in sense on whether overspeed or underspeed is indicated and being zero for on-speed. This signal in turn controls the PU relay and the blade angle $B_p$ servo, Fig. 3. The $B_p$ servo in turn is used to compute the $P_L$ signal, Fig. 4, which is fed back as above described to the N servo. Thus the servo loop is complete for representing the "dead-beat" characteristic of the propeller control system to be simulated. Simulated synchronization of the four engines takes place as previously described.

Abnormal in-flight conditions, such as feathering due to mal-functioning of the engine system, failure of feathering control, etc., may be simulated by means of the apparatus previously described, a summary of which follows.

*Feathering*

When simulated engine trouble occurs, feathering is immediately initiated in order to avoid undesirable "windmilling" and drag of the propeller. Feathering may be accomplished either by the pilot through his condition lever which initiates the feathering action at the feather switch relay 110, or through his panic handle which causes direct energization of the feather and feather pump relays, or automatically through the torgue servo when the negative torque due to windmilling exceeds a critical value, namely $-1250$ in. $-$lbs. If due to failure of the feather control simulated by movement of the ENTC switch 179 to FAIL, the negative torque continues to drop to an even greater critical value, such as $-4800$ in. $-$lbs., tending to cause a yawing drag on the aircraft, automatic decoupling of the engine and propeller occurs as described in the aforesaid Lem application so that the negative torque is within safe limits while the prop is being feathered through the condition lever. During this operation the Q servo runs to zero, whereupon the engine and propeller are automatically recoupled so that the apparatus may be in readiness for an "air start."

Assuming now that the pilot has produced feathering through his condition lever as above described, the propeller represented by the $B_p$ system remains at the feather position, i.e. maximum pitch, as long as the condition lever is positioned at FEATHER. If the condition lever should fail to cause feathering, as by opening of the FE. MOT. circuit breaker 107, the panic handle may be used. When the panic handle is thrown to PANIC position the feather relay is automatically energized from the bus as above described through the series-connected panic switch 182 and FE. SW. switch 176, and the governor connect (GOV. CON.) relay which determines ATE control, is deenergized by the panic switch 108, thus automatically transferring the control from ATE to "emergency feather." This operation of the panic handle also directly energizes through the panic switch 182 the feather timing control (FE.TIM.CONT.) relay 181 which, through its switch 183, b contact, energizes the feather pump relay 101 which is generally energized together with the feather relay 99 during the feathering operation.

The operation of the $B_p$ and N servos incident to the feathering operation is controlled by the relays which now are positioned as follows: the feather and feather pump relays are energized, the GOV. CON. relay is deenergized with consequent deenergization of the ATE and SYNC relays. Referring now to Fig. 2, the EL.GOV. input at terminal 156 is grounded through ATE switch 158, b contact; the MECH. GOV. and SAFE LIM. inputs are grounded through FEA. relay switch 157, a contact; the FE Pump Fail input is grounded through FE. PUMP relay switch 173, a contact; and the Ma Eng. Gov. input is grounded through the SYNC switch 200, a contact. Accordingly, the sole remaining active input signal −RPM at terminal 152 now produces an overspeed signal in the PU system which cuts out the thyratron and deenergizes the PU relay and also energizes the $B_p$ system at terminal 161, Fig. 3, so as to increase $B_p$ toward feather, and consequently reduce the $P_L$ signal so as to in turn reduce r.p.m. at the N servo.

When the PU relay drops out, Fig. 1, the alternate circuit for the AUTO relay is closed through switch 194 ensuring energization of this relay to allow feathering from the Flight Idle blade angle. Referring now to Fig. 3, the +FI STOP input is grounded through AUTO switch 71, a contact; the +$P_L$ input remains grounded through B range switch 66, a contact; and the −ANS input is grounded through AUTO switch 89, a contact. The remaining input signal ±PU, which corresponds to the overspeed PU signal above referred to, is fed through the AUTO switch 88, a contact, to drive the $B_p$ servo toward maximum blade angle, i.e. feather. As the $B_p$ servo runs toward feather, the $P_L$ signal which is derived from the $B_p$ pots 140 and 142, Fig. 4 is accordingly decreased toward its minimum value.

Referring to the N system, Fig. 5, the active input signals are now the "$V_T$ effect" at terminal 43 and the torque signal (derived from the Q servo and the aforesaid $P_L$ signal) at terminal 41. As the $P_L$ signal decreases with increased $B_p$ and the Q signal decreases due to fuel cut-off, the N servo under the reduced torque signal runs down toward lower r.p.m. under influence of its answer pot 22; also the derived "$V_T$ effect" signal at pot 44 is gradually reduced toward zero as the slider 44' is moved toward the upper grounded position representing maximum $B_p$ or feather, thus reducing the resultant input signal at the N servo to a minimum value and causing the N servo to position accordingly. The propeller system is now represented as being feathered and at minimum or zero r.p.m.

If on a call for emergency feathering for any reason, the electric feather pump should fail, feathering is partially completed by the engine-driven oil pump so as to cause r.p.m. to drop to about 4200 where it remains constant. At this r.p.m. there is insufficient pump pressure to produce further feathering. This operation is simulated by feeding a FEA. PUMP FAIL signal +E from switch 155, Fig. 2, to the PU input terminal 170 through the series-connected feather pump and feather relay switches 173 and 171. As this signal is less than the −RPM signal, the resultant input signal is negative, an overspeed condition is indicated by the PU output signal and $B_p$ is increased toward feather. This causes the N servo to run down until r.p.m. is about 4200, at which point the PU governing signal is zero and the $B_p$ servo indicates a fixed pitch, thus simulating the limit of feathering by the engine-driven pump. All feathering operations take place as above described when the electric feather pump is lost.

*Air start*

As above indicated prerequisites for the "air start" are that the propeller be at feather and of course the propeller and engine units normally coupled. As the torque at feather is zero, the units will be assumed coupled and the turbine r.p.m. at zero. Air start is initiated by moving the condition lever to the AIR START position, thereby opening the condition lever switch 111 to ensure deenergization of the governor connect relay 105, and hence the ATE and SYNC relays 96 and 120 respectively, and closing the condition lever switch 180 at its AS contact to energize the feather pump relay 101. The power lever is positioned at its flight idle FI position thereby maintaining the cams 12 and 106 at the FLIGHT position thus ensuring deenergization of the Beta range relay, Fig. 1. The panic handle is of course returned to its NORMAL position so that the feather relay is now deenergized. As the blade angle is greater than the FI value, the AUTO relay will be energized through the FI relay.

With energization of the feather pump relay 101, Fig. 2, and with the RPM now less than 4000, a MECH.GOV. signal +E is fed to the PU input terminal 164 through the FE.PUMP switch 172, a contact, N cam switch 155, b contact, FEA. switch 157, b contact, ATE switch 169, b contact, and Beta switch 166, b contact. As above indicated, the other inputs are grounded out except for the −RPM signal which is zero. Accordingly, the resultant input signal is +E which produces a large underspeed signal at the PU output, thereby picking up the PU relay. This signal also energizes the $B_p$ servo through the AUTO switch 88, a contact, so as to decrease blade angle and bring the propeller out of feather, the other primary signals including the −ANS signal being grounded out so that the $B_p$ servo now integrating, runs toward lower pitch under influence of the PU signal. During this operation, the $B_p$ servo is damped a certain amount by the shunt feedback FDBK₂ that is connected in circuit by the feather pump switch 102 to simulate the un-feathering rate.

Referring now to Fig. 5, it will be seen that as $B_p$ decreases, the "$V_T$ effect" signal from pot 44 is increased, thus simulating the windmilling torque tending to drive the turbine. Accordingly, the N servo runs upward from its zero position toward a value at which the FLAME relay may be assumed energized, the Q servo operating and the N servo now running up to normal speed under influence of the torque signal from pot 42. When the "air start" has been accomplished (evidenced by the engine temperature as described in the aforesaid Lem application) the condition lever is thrown from AS to NORMAL and the power lever is advanced. As the condition lever switch 180, Fig. 1, is moved to NOR- MAL, the feather pump relay 101 is deenergized, thus removing the MECH.GOV. signal at the PU input; the GOV.CON. relay 105 is energized by the condition lever switch 111 and the system operates as described under "Normal In-Flight Control."

In the operations so far described, the conditions of the feather and feather pump relays may conveniently be listed as follows:

|  | Feather Relay Energized | Feather Pump Relay Energized |
|---|---|---|
| Normal Flight | No | No |
| Feather | Yes | Yes |
| Air Start | No | Yes |
| Feather Pump Fail | Yes | No |
| Panic | Yes | Yes |
| ENTC Fail | Yes | No |

Pitch lock

As above indicated, "pitch lock" is freezing of the blade angle at a critical r.p.m. so as to prevent any further r.p.m. increase that otherwise might occur if $B_p$ were decreased. Normally the pitch lock relay is deenergized, Fig. 3, so that its switch 91 permits normal functioning of the $B_p$ motor winding 76. The conditions for energization of the pitch lock relay 93 have previously been explained in connection with Fig. 1. Summarizing briefly, the relay is picked up when r.p.m. reaches 14,400 and is locked in by a holding circuit that is effective until r.p.m. drops below 14,250; also an alternate holding circuit for the pitch lock relay is effective in case the PU relay 92 is energized, i.e. indicating underspeed with call for decreased pitch. Thus the pitch lock relay can be deenergized only when the PU relay drops out to indicate call for increased pitch and r.p.m. drops below 14,250.

Referring to Fig. 3, the "pitch lock" control of the $B_p$ servo will now be apparent. With the pitch lock and PU relays both energized to indicate blade angle "freeze," the $B_p$ servo motor control winding 76 is shorted out by series-connected switches 90 and 91 and the blade angle is locked in position. However, if the PU relay should become deenergized (call for increased $B_p$), the pitch lock relay remaining energized, the winding 76 can be energized through the b contact of switch 90 and the $B_p$ servo motor is now operative to increase the blade angle and thus reduce r.p.m. to the point where the pitch lock relay also drops out. Thus with "pitch lock" in effect, the $B_p$ servo can increase blade angle to reduce r.p.m. but it cannot enhance the overspeed condition by decreasing the blade angle, thereby simulating mechanical ratchet operation for "pitch lock."

Landing

When "landing" is to be simulated, the power lever is retarded to flight idle (FI) position which causes the Q servo to run down, the torque signal to decrease, Fig. 5, and the N servo to run down to an underspeed r.p.m.

The $B_p$ servo under influence of the PU underspeed signal then runs toward lower pitch until N is stabilized at on-speed. If a blade angle lower than the FI value (about 9°) is called for, $B_p$ is blocked mechanically at this limiting value in the aircraft. This is simulated by the $B_p$ controlled FI relay 184, Fig. 1, which drops out the AUTO relay at the FI value thus stopping the normal governing operation.

Referring now to Fig. 3, it will be seen that AUTO switch 71 in series with Beta switch 67 feeds to the $B_p$ servo a signal $+E$ representing the flight idle stop angle. The normal PU input is now grounded out by AUTO switch 88, so that the $B_p$ servo functions through its answer circuit (switches 89 and 69) to position at the FI angle.

Assuming now that the power lever is subsequently advanced somewhat above the FI position on a call for more power, the resulting Q increase causes r.p.m. to increase, Fig. 5 and PU to indicate overspeed, Fig. 2, results in the PU relay 92 dropping out and the AUTO relay to be energized through its alternate circuit, Fig. 1. This cuts out the FI stop signal and reconnects the PU input to the $B_p$ servo so as increase $B_p$, thus returning the system to normal governing operation.

Summarizing, the FI STOP signal that is introduced in place of the PU signal when the power lever is retarded to its FI position, causes the $B_p$ servo to run down to its FI value where it is stabilized to block further decrease of blade angle. However, by reason of the PU and AUTO relays, the FI STOP signal may be cut out to restore the PU signal and thus permit increase of blade angle on a call for more power; if such is needed.

When the simulated flight reaches ground, the power lever is further retarded so that it is now in the Beta or ground range wherein the cams 12 and 106 are positioned to close the respective switches 11 and 112 at GND, Fig. 1, automatic governing control is cut out, the Beta relay is energized and blade angle control is directly subject to the power lever Fig. 3. In this condition the $B_p$ servo (now a position servo) can be run down toward flat pitch under control of the PL signal to reduce forward thrust, and if desired can be further run to "reverse pitch" to produce reverse or braking thrust.

A secondary effect of reverse thrust is simulated by means of the $B_p$ pot 44, Fig. 5, that is grounded at a point to represent flat or zero pitch. The lower terminal of this pot is energized by the signal $-V_T$ so that when the $B_p$ servo indicates reverse pitch, a "$V_T$ effect" signal of negative sense is fed to the N servo, thus opposing the torque signal from pot 42 and tending to reduce r.p.m. However, r.p.m. remains substantially constant by reason of the scheduled fuel flow in the Beta range as described in the aforesaid Lem application.

Mechanical governor and safe limit control

Referring to Fig. 2, the mechanical governor (MECH. GOV.) signal $+E$ from the N cam switch 155 may be applied under both ground and flight conditions of the Beta relay 6, depending on the automatic governing ATE relay, assuming that r.p.m. is greater than 4,000 which is usually the case. That is, if ATE control is lost in flight, the ATE input is grounded and the MECH. GOV. signal is then automatically fed through the ATE and Beta relay switches 169 and 166 respectively to the PU input terminal 164. This signal represents r.p.m. of about 13,600 and governs the PU system accordingly in the absence of the ATE control.

When operating solely in the Beta or ground range an additional SAFE LIMIT signal is applied to the PU system so that the combined MECH. GOV. and SAFE LIMIT signals represent an upper r.p.m. limit of 15,000. Therefore if due to some malfunction, the engine should try to overspeed beyond 15,000 r.p.m. the PU thyratron and relay would be deenergized, causing the AUTO relay to be energized through its alternate circuit and thereby return the blade angle control from the power lever to the automatic governing ATE control. This SAFE LIMIT input at the PU terminal 168 is conveniently connected in parallel with the MECH. GOV. input so as to be energized by the aforesaid $+E$ signal. In the flight range the SAFE LIMIT input is unnecessary and is grounded out by the Beta switch 167.

System shut down

When the system is to be shut down after "landing," the condition lever is moved to GND STOP, the power lever remaining at the "ground idle" position within the Beta range and the $B_p$ servo being at flat pitch under control of the PL signal. The propeller control is not affected when the condition lever is moved to GND STOP, as NORMAL control continues in effect. However, the engine fuel supply is shut off so that the Q servo runs to zero (as described in the aforesaid Lem application) which in turn causes the N servo also to run to zero, thereby simulating complete engine shut down.

*System fail controls*

In the aircraft, certain circuit breakers are connected in the electrical system for overload protection and when they trip open produce various conditions affecting the propeller control. Referring to Fig. 1, these conditions are simulated by means of a number of circuit breakers indicated as connected in the circuits of certain key or principal relays. These circuit breakers are normally closed to complete the respective circuits and are opened under simulated overload conditions, malfunctioning of the electrical system, etc.

Referring first to the master synchronizing (Ma SYNC) circuit breaker 197, opening of this breaker simply deenergizes the Ma ENG relay 195 (assuming that the synchronizing control is under the No. 2 engine), with the result that the synchronizing control is automatically transferred back to the No. 1 engine.

The feather motor (FE MOT) circuit breaker 107 affects the FEA PUMP relay 101 and the GOV. CON. relay 105 which in turn controls the ATE and SYNC relays. Accordingly when the FE MOT circuit breaker 107 is opened the GOV.CON. relay is deenergized and both ATE and SYNC controls are lost and the system is automatically transferred back to mechanical governing control as above described. Closing of the FE MOT circuit breaker restores the ATE and SYNC controls. The Fea PUMP relay is not necessarily lost when circuit breaker 107 opens and may be energized through an alternate circuit under control of the panic handle as presently described.

The emergency feather timer (Em Fe Tim) circuit breaker 198 affects the aforesaid alternate circuit, i.e. the panic handle control circuit for the FEA PUMP relay 101. This alternate circuit is effective only when the panic handle is thrown to energize the feather timer control relay 181. Thus, opening of circuit breaker 198 prevents "panic" operation of the feather pump. The normal control circuit for the FEA PUMP relay 101 is through the feather switch relay contact 109 under control of the condition lever. Accordingly if both the Fe MOT circuit breaker 107 and the Em Fe Tim circuit breaker 198 trip open at the same time, the FEA PUMP relay cannot be energized, thus simulating inability to use the electric feather pump while the circuit breaker is open.

The emergency feather circuit breaker 199 affects both the Fe Tim Cont relay 81 and the feather relay 99 for panic handle control. That is, the feather pump relay and the feather relay cannot be energized through the panic handle when the circuit breaker 199 is out. However, alternate circuits as above described may be available for energizing these relays under control of the condition lever if the circuit breaker 199 should open. Thus the effects of opening the aircraft's overload protection circuit breakers for the propeller control system are simulated by means of switches in the circuitry of the principal control relays.

It should be understood that this invention is not limited to specific details of construction and arrangement thereof herein illustrated, and that changes and modifications may occur to one skilled in the art without departing from the spirit of the invention.

What is claimed is:

1. Flight training apparatus for simulating the propeller system of turbo-propeller aircraft having a simulated power lever movable through control ranges representing "ground" and "flight" conditions, respectively, and turbine torque computing means, comprising simulated propeller load computing means, an electrical computing system representing turbine r.p.m. responsive to a torque signal that is produced by said torque computing means jointly with a propeller load signal that is produced by said propeller load computing means, a second electrical computing system representing automatic governing control jointly responsive to a signal representing turbine r.p.m. from the r.p.m. system and a signal representing a reference r.p.m. for in turn producing a simulated r.p.m. overspeed or underspeed error signal, a third electrical computing system representing propeller blade angle responsive to said error signal for adjusting simulated blade angle, the aforesaid propeller load computing means being responsive to a signal representing propeller blade angle from the blade angle computing system for computing the simulated propeller load, and means controlled by the power lever for alternative control of said third system so that said system is controlled by manual operation of said power lever in the "ground" range thereof, and is controlled by said error signal when the power level is in the "flight" range.

2. Flight training apparatus as specified in claim 1 having a first relay means adapted to be controlled according to the overspeed or underspeed sense of the automatic governing signal, a second relay means representing automatic governing adapted to be controlled by the blade angle system when said system is at a position representing the blade angle as exceeding "flight idle" blade angle, said first relay means when under control of an overspeed signal adapted to control the automatic governing relay when blade angle is represented as at flight idle or less, so that said governing relay is in condition for simulated automatic governing control of the blade angle system at less than the flight idle value.

3. Flight training apparatus as specified in claim 1 having means for simulating the propeller "flight idle" angle stop comprising switching means for applying a constant signal to the blade angle system, said switching means being controlled by the power lever in the "flight" range thereof and according to the simulated automatic governing control in the non-governing position thereof jointly to apply said signal.

4. Flight training apparatus as specified in claim 1 having signal deriving means operable by the power lever, and relay means controlled by the power lever in the "ground" range thereof for applying according to the position of the power lever a derived signal to the blade angle system for simulating direct control of blade angle by the power lever for "ground" operation.

5. Flight training apparatus as specified in claim 1 wherein the blade angle system is a servo motor system alternatively operable as an integrating and position servo, and switching means controlled according to the position of the power lever and according to the sense of the simulated automatic governing control for causing the blade angle servo to function as a position servo when the power lever is in the "ground" range and also when the power lever is in the "flight" range and the automatic governing control is in the non-governing position, and as an integrating servo when the power lever is in the "flight" range and the governing control is in the governing position wherein the automatic governing signal controls the blade angle servo.

6. Apparatus as specified in claim 1 having relay means controlled according to the respective operating ranges of the power lever for selectively applying the automatic governing error signal to the third electrical computing system representing propeller blade angle when the power lever is in the "flight" range, and for applying a signal according to the position of the power lever representing manual control of the blade angle when the power lever is in the "ground" range.

7. Flight training apparatus as specified in claim 1 having computing means for producing a signal representing air density, wherein the propeller blade angle computing means is also responsive to turbine r.p.m. and air density signals.

8. Flight training apparatus as specified in claim 1 wherein the means for producing the automatic governing signal comprises an electrical system having an input network energized by the r.p.m. signal and alternatively by signals representing respectively electronic acceleration sensitive governing and mechanical governing, and means under control of the pilot for selectively applying the alternative signals according to the simulated operating condition of the propeller system and aircraft.

9. Flight training apparatus as specified in claim 8 having means controlled by the power lever in the "ground" range thereof for also applying to the network, a signal representing an upper safe limit of turbine r.p.m.

10. Flight training apparatus as specified in claim 8 in combination with duplicate apparatus for simulating multiple turbo-propeller units having simulated synchronizing means including means for selecting one apparatus as a master speed control, means controlled by the r.p.m. system of that apparatus for producing a signal representing a correction error with respect to a reference r.p.m. representing the setting of the electronic governor, and means controlled by said selecting means for applying said error signal to the respective networks of the other duplicate apparatus for producing governing signals tending to maintain all duplicate apparatus at simulated synchronous r.p.m. with respect to the selected apparatus.

11. Flight training apparatus as specified in claim 8 having relay means adapted to be controlled when the power lever is in the "ground" range for applying signals representing mechanical governing and safe r.p.m. limit respectively to the network, said relay means being controlled so as to be in an alternate position when the power lever is in the "flight" range, a second relay means adapted to be controlled when the condition lever is at "normal" and the first named relay means under "flight" control for cutting out said mechanical governing and safe-limit signals and for applying a signal representing electronic governing to the network, both said relay means being interrelated so that if the second relay means is in a control position representing loss of the simulated electronic governing control with the resultant cutting out of the electronic governing signal, the mechanical governing signal is applied jointly by both said relay means to the network.

12. Flight training apparatus as specified in claim 8 wherein the means under control of the pilot comprises a condition lever movable to positions representing "air start," "normal" and "feather" and the aforesaid power lever, said condition lever in the "normal" position thereof coincident with the power lever in the "flight" range controlling means for selectively applying to the network the electronic governing signal, and said power lever in the "ground" range thereof controlling means for cutting out the electronic governing signal and applying the mechanical governing signal.

13. Flight training apparatus as specified in claim 12 having means controlled by the condition lever at the "feather" position thereof for cutting out the electronic and mechanical governing signals so that the automatic governing signal resulting from the dominant r.p.m. signal represents an overspeed condition, said overspeed governing signal energizing the blade angle system so as to operate said system to an increased blade angle position representing "feather."

14. Flight training apparatus as specified in claim 13 having means representing an electric feather pump for applying a signal to the automatic governing input network for representing "failure" of the electric feather pump, coincident with positioning of the condition lever at "feather," the resulting governing signal causing the blade angle system to run to an intermediate blade angle position and the r.p.m. system to run to a low speed indication thereby simulating partial feathering by the engine oil pump upon failure of the electric feather pump.

15. Flight training apparatus as specified in claim 1 having means for applying a signal representing "starter" torque to the turbine r.p.m. system under control of the r.p.m. system and means for applying an additional signal representing added torque due to simulated firing of the turbine.

16. Flight training apparatus as specified in claim 15 having means controlled jointly by the blade angle system and by a signal representing airspeed for producing and applying to the r.p.m. system a signal representing the airspeed effect on the propeller r.p.m.

17. A system for electrically simulating the operation of a propeller pitch lock system having a rotatable device subject to on-off mechanical ratchet control wherein the ratchet is made effective to block rotation and corresponding blade angle change in one direction and to permit rotation in the opposite preferred direction and alternatively, to be made ineffective thereby permitting rotation in either direction, comprising a reversible electric motor representing said rotatable device and having a control winding, means for applying control signals to said motor alternative in sense tending to cause corresponding rotation of the motor in one direction or the other, a pair of relays having interrelated switching means for selectively deenergizing said control winding so as to lock said servo motor in position, and for energizing said winding to rotate the motor in said preferred direction, one of said relays being controlled according to a simulated propeller pitch lock condition, and the other relay being controlled according to the sense of the motor direction signal for permitting operation of the motor only in the preferred direction during simulated pitch lock.

18. A system for electrically simulating the operation of a rotatable device subject to mechanical ratchet control wherein the ratchet is operable selectively to block rotation in but one direction, to permit rotation in either direction and to block rotation in both directions, comprising a reversible electric motor representing said rotatable device and having a control winding, a relay switching system for selectively controlling according to a plurality of simulated conditions the sense of energization of said winding, and for blocking rotation of said motor, said system including means jointly responsive to a motor winding input signal of predetermined sense representing one of said conditions and a signal representing another condition for permitting rotation in but one direction, said other condition signal when of opposite sense controlling said means for permitting rotation in alternate directions, said means being responsive jointly to said last named condition signal and to the input signal of sense opposite to said predetermined sense for blocking rotation of said motor notwithstanding application of motor input signals.

References Cited in the file of this patent

UNITED STATES PATENTS

| | | |
|---|---|---|
| 1,960,350 | Shackelton et al. | May 29, 1934 |
| 2,397,477 | Kellogg | Apr. 2, 1946 |
| 2,506,949 | Burlebach | May 9, 1950 |
| 2,608,005 | Kennedy | Aug. 26, 1952 |
| 2,788,589 | Stern | Apr. 16, 1957 |
| 2,798,308 | Stern et al. | July 9, 1957 |
| 2,804,698 | Grandmont | Sept. 3, 1957 |
| 2,824,388 | Stern et al. | Feb. 25, 1958 |